Jan. 28, 1941.  B. H. SHINN  2,230,193
WHEEL
Filed Jan. 26, 1938  2 Sheets-Sheet 1

INVENTOR
Byron H. Shinn
BY Albert R. Ely
ATTORNEY

Jan. 28, 1941.  B. H. SHINN  2,230,193
WHEEL
Filed Jan. 26, 1938  2 Sheets-Sheet 2

INVENTOR
Byron H. Shinn
BY
Albert R. Ely
ATTORNEY

Patented Jan. 28, 1941

2,230,193

UNITED STATES PATENT OFFICE 2,230,193

WHEEL

Byron H. Shinn, Butler, Pa., assignor to The Firestone Tire & Rubber Company, Akron, Ohio, a corporation of Ohio Application January 26, 1938, Serial No. 187,000

5 Claims. (Cl. 301—63)

This invention relates to wheels, and more especially it relates to wheels such as are used on the landing gear of airplanes and which are adapted to carry pneumatic tires.

Wheels of the character mentioned require to be as light in weight as is consistent with the strength required, and require ample lateral bracing to withstand the side thrusts to which they frequently are subjected. Furthermore, the wheel must be of relatively small diameter.

The chief objects of the invention are to provide an airplane landing wheel that will be light in weight; that is so constructed as to have relatively great strength in comparison to its weight; that is especially adapted to resist and sustain lateral thrust; and to provide a wheel construction wherein most of the stresses therein are compressive stresses. Other objects are to provide simplicity of construction, and reduction of cost. Other objects will be manifest as the specification proceeds.

Figure 1:
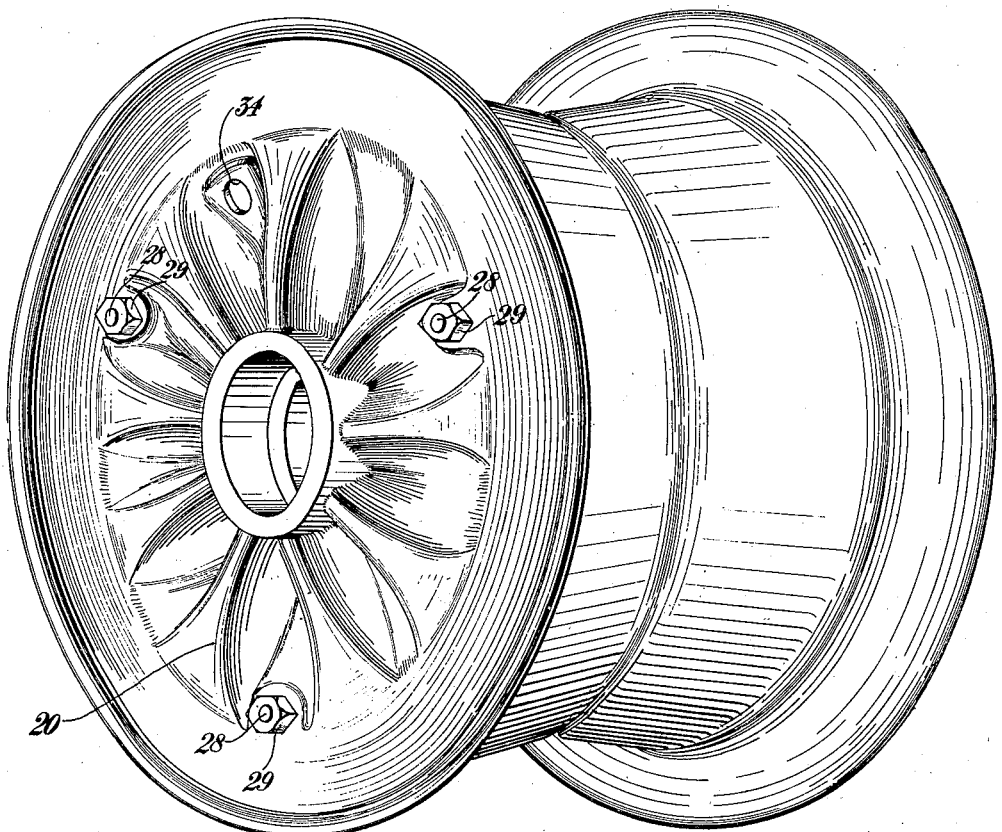
Figure 1 is a perspective view of the improved wheel, in its preferred form.
Figure 2:
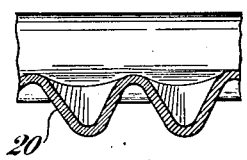
Figure 2 is a section on the line 2—2 of Figure 4.
Figure 4:
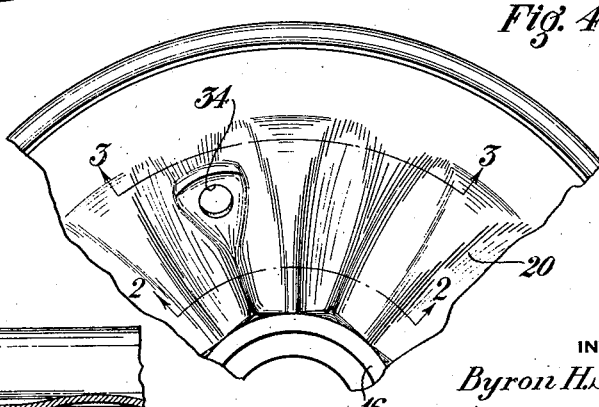
Figure 4 is a fragmentary elevation of an end of the wheel.
Figure 3:
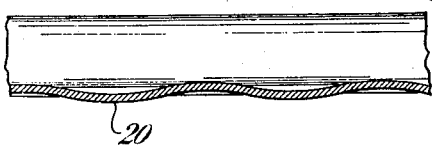
Figure 3 is a section on the line 3—3 of Figure 4.

Referring to the drawings, it will be seen that the improved wheel comprises two generally similar axial portions 10, 11 that are assembled upon a common tubular axial sleeve 12, and abut each other substantially at the medial plane of the wheel. The wheel-portions 10, 11 comprise respective solid cast metal end-members or heads 13, 14 that are substantially identical except that head 14, which is the inner head of the wheel, is provided with an integral brake drum 15. Each head comprises a hub portion 16, and mounted in said hub portions are respective roller bearings 17, 18, the latter being somewhat larger than the former and located in head 14. The inner lateral face of each head 13, 14 is formed, near its outer periphery or rim portion, with a concentric flange 19 extending substantially at right angles thereto, said flanges constituting bead seats for a pneumatic tire that may be mounted upon the wheel. Between its hub 16 and the flange 19 of its rim, each of the wheel heads consists of a radially corrugated web structure 20, the corrugations of which are deepest at the hub and taper in depth therefrom outwardly to the rim portion with which they gently merge. As will be seen from reference to Figure 2, the crests of successive ridges or corrugations are disposed on opposite sides of the plane of the rim portion of the wheel head, a section of the web as shown in Figure 2 constituting substantially a plurality of connected triangular sections. This construction substantially conforms to the theoretical stress analysis and constitutes, in effect, an infinite number of spokes arranged in the proper direction between hub and rim to give maximum reinforcement against side thrust on the wheel.

The arrangement is such that substantially only compressive stresses obtain in the web 20, tensile stress being reduced to the minimum. For this reason it is possible to make the web relatively thin whereby lightness of weight and reduced cost are achieved.

Each of the wheel portions 10, 11 also comprises a thin, concentric, sheet metal structure that includes a generally cylindrical portion 22 and a frusto-conical portion 23, which portions are integrally united by a relatively narrow portion 24 that is disposed parallel to the plane of the wheel and connects the large end of the frusto-conical portion 23 with one end of the cylindrical portion 22, the latter portion circumscribing the frusto-conical portion. The other end of said cylindrical portion is connected to the wheel head 13 or 14, being fitted into the angular bead seat at the juncture of the rim and flange 19, and being folded or spun over the outer periphery of said rim as shown at 25. Each frusto-conical portion 23 is secured at its small end by being confined thereat between a wheel head and a radial flange 12a formed on the sleeve 12. In the assembled condition of the wheel, narrow faces 24 of the respective sheet metal structures are in abutting relation to each other, and said faces are formed with respective complemental protuberances and concavities, best shown at 26, that interfit each other and thus lock the respective halves 10, 11 of the wheel structure against relative angular movement.

The two halves of the wheel structure are retained in assembled relation by means of a plurality of bolts or tie rods 28, 28, herein shown as three in number, which bolts are placed near the outer periphery of the wheel, immediately inside the head flanges 19. The bolts 28 extend through each of the wheel heads, and through the narrow walls 24 of the sheet metal structures thereon, there being a nut 29 on that end of each bolt that extends through front head 13. Positioned about each bolt 28 are two metal sleeves 30, 31 of which sleeve 30 extends from head 13 to narrow wall 24 of its sheet metal structure and sleeve 31 is similarly disposed between head 14 and wall 24 of its sheet metal structure. The bolts 28 are set up tightly, and thus place the respective conical portions 23 of the sheet metal structures under compressive stress with the result that an extremely rigid wheel structure is produced.

The wall 22 of wheel portion 10 may be apertured at 23 to enable the valve stem of a pneumatic tire on the wheel to extend therethrough, and an aperture 34 may be formed in wheel head 13 to accommodate said valve stem so that the latter will be accessible at the front of the wheel. Conical portion 23 on wheel head 13 may be apertured at 35 to permit the use of the finger for guiding and inserting the valve stem in aperture 34.

It will be seen that the sheet metal structures of the wheel, including the frusto-conical portions 23 thereof, constitute a cantilever construction that imparts a high degree of radial strength to the wheel. Furthermore, lateral thrust against either wheel head will be strongly resisted by the frusto-conical portion 23 of the other wheel head, which portion is disposed substantially parallel to the direction of such thrust. The feature of securing the sheet metal structures to the wheel head by spinning them around the outer periphery of the latter obviates the use of rivets for this purpose, and also provides smooth seats for the bead portions of a tire that may be mounted upon the wheel.

Figure 5:
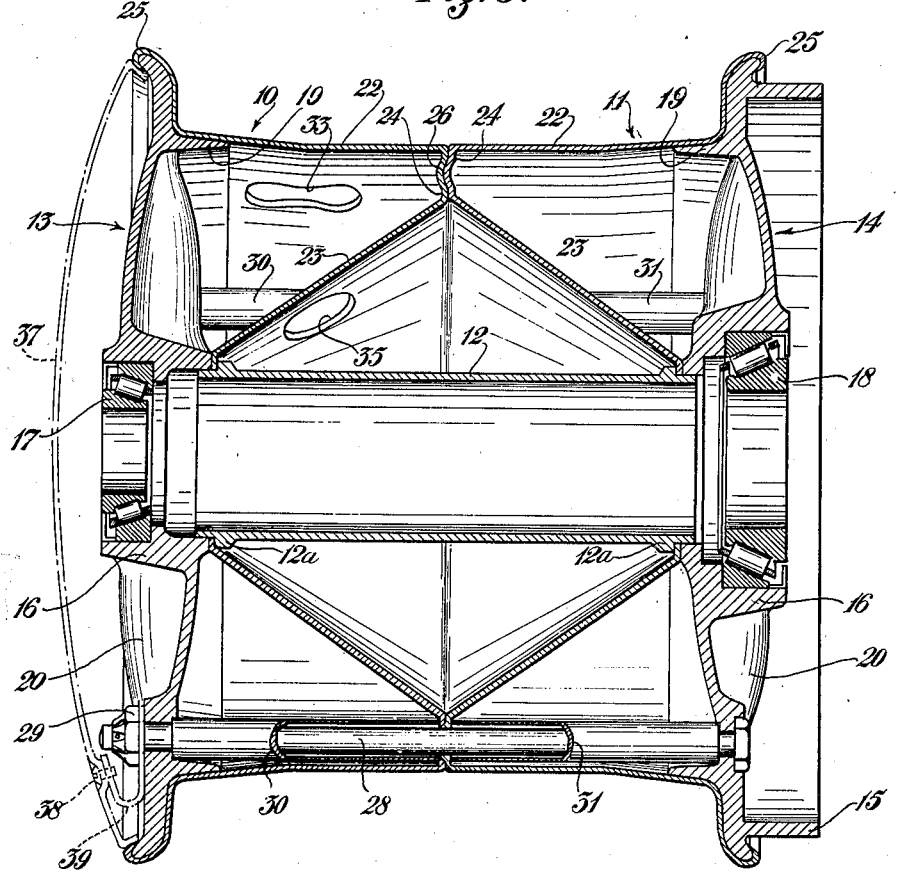
Figure 5 is a longitudinal diametric section of the wheel.

In Figure 5 there is shown in broken lines a hub cap or fairing 37 with which the wheel usually is provided. Said fairing consists of a circular concavo-convex structure, the perimeter of which fits against the outer peripheral portion of wheel head 13. The fairing 37 is retained on the wheel by means of screws, such as the screw 38, that are threaded into respective clips 39 that are held in place upon the outer face of head 13 by the nuts 29 on bolts 28. The purpose of the fairing is to reduce wind resistance on the outer face of the wheel.

The improved wheel shown and described possesses a high degree of strength as compared to its weight, and it achieves the other objects set out in the foregoing statement of objects.

Figure 6:
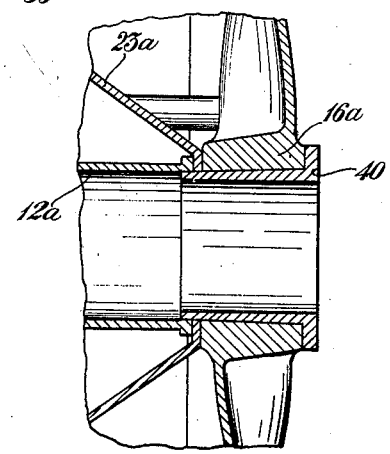
Figure 6 is a fragmentary sectional detail of the hub portion of another embodiment of the invention.

The embodiment of the invention shown in Figure 6 is essentially the same as that previously described, but differs therefrom in that the roller bearings are dispensed with and bronze bearing bushings, such as the bushing 40, used in their stead. As shown, each bushing 40 has a force fit within the hub portion 16a of a wheel head, and also fits within the adjacent end of the axial sleeve 12a. The inner end of a frusto-conical structure 23a is confined between the end of said sleeve and the inner lateral face of said hub.

Other modification may be resorted to without departing from the spirit of the invention or the scope thereof as defined by the appended claims.

What is claimed is:

1. A wheel for pneumatic tires, said wheel comprising a pair of spaced apart end-heads, each of said end-heads including a unitary hub portion, a rim portion, and a rigid web between said hub and rim portion, annular tire supporting structures mounted concentrically upon the respective end-heads each of said structures comprising a frusto-conical portion having its smaller end bearing against the hub portion of the end-head, and a cylindrical portion circumscribing said frusto-conical portion and united therewith at the large end thereof, said cylindrical portion being folded over the perimeter of the rim portion of the end-head, and a plurality of bolts drawing the two end-heads toward each other with the tire supporting structures compressed therebetween.

2. A wheel for pneumatic tires, said wheel comprising a pair of spaced apart end-heads, each of said end-heads including a unitary hub portion, a rim portion, and a rigid web between said hub and rim portion, an annular tire supporting structure mounted concentrically upon the respective end-heads, a plurality of spacers within the wheel adjacent the tire supporting structure, and a plurality of bolts drawing the two end-heads toward each other with the tire supporting structure and the spacers compressed therebetween.

3. A wheel for pneumatic tires comprising a pair of spaced end-heads, each of said end-heads including a unitary hub portion, rim supporting portion in radial alignment with said hub and a rigid web between said hub and said rim supporting portion whereby the web carries the load in direct compression, a rim-forming structure for each of said end-heads comprising a frusto-conical portion having its smaller end bearing against the hub portions of the respective end-heads, and a cylindrical portion circumscribing said frusto-conical portion and united therewith at the large end thereof, and means holding said end-heads together to place said rim forming portions under compression whereby the two units of the wheel are held together and resist forces in all directions as a unit and with the material of the wheel structure, except the holding means, being subjected primarily to compression stresses.

4. A wheel for pneumatic tires comprising a pair of spaced end-heads, each of said end-heads including a unitary hub portion, a rim supporting and side flange tire-retaining portion in radial alignment with said hub and a rigid web between said hub and said rim supporting portion whereby the rim carries the load in direct compression, a rim-forming structure for each of said end-heads comprising a cylindrical portion having one lateral margin supported on said rim-supporting portion and spun over in hooked engagement with the periphery of the tire retaining flange, and a frusto-conical section integrally joined at the larger end of said frusto-conical section with such cylindrical portion and having its smaller end engaging said hub, and means holding said end-heads together to place said rim-forming portions under compression whereby the two units of the wheel are held together and resist forces in all directions as a unit and with the material of the wheel structure, except the holding means, being subjected primarily to compression stresses.

5. In a wheel for pneumatic tires, the combination of a pair of spaced-apart end-heads and a metal structure therebetween for supporting a pneumatic tire thereon, each of said end-heads consisting of a one-piece structure comprising a hub, a radially corrugated web extending substantially radially between said hub and rim portion, a tire rim portion in substantially radial alignment with said web, said metal structure comprising a frusto-conical portion for each end-head having its smaller end bearing against the hub portion of one end-head and an integral cylindrical portion circumscribing each of said frusto-conical portions and united therewith at the large ends thereof, said cylindrical portions being folded over the outer periphery of the respective end-heads, and means adjacent said cylindrical portion of said metal structure engaging said end-heads together and placing said metal structure under compression in an axial direction.

BYRON H. SHINN.